United States Patent
Bobard

[15] 3,696,880
[45] Oct. 10, 1972

[54] REMOVABLE POSITIONABLE VEHICLE CONTROL CENTER

[72] Inventor: Emile Bobard, P.O. Box 17, Beaune, France

[22] Filed: Dec. 12, 1969

[21] Appl. No.: 884,523

Related U.S. Application Data

[63] Continuation-in-part of Ser. No. 652,472, July 11, 1967, abandoned.

[52] U.S. Cl. .............................. 180/77 R, 280/421
[51] Int. Cl. ................................... B60k 29/00
[58] Field of Search ............... 180/77; 280/421, 422

[56] References Cited

UNITED STATES PATENTS

| | | |
|---|---|---|
| 2,733,033 | 1/1956 | Gunderson..........280/421 UX |
| 2,831,544 | 4/1958 | Dunn et al..............180/77 X |
| 3,036,652 | 5/1962 | Barenyi...................180/77 X |

Primary Examiner—A. Harry Levy
Attorney—Wilkinson, Mawhinney & Theibault

[57] ABSTRACT

A self-contained control unit mounted on a motor vehicle including driving and steering means wherein a control unit for remotely operating the driving and steering means includes at least partially hydraulic flexible pipe lines which are supported by a pivotal arm connected at one end thereof to an upright equipped with height-regulating means and at the other end to a deformable sheath provided with a terminal spout curved downwardly.

15 Claims, 17 Drawing Figures

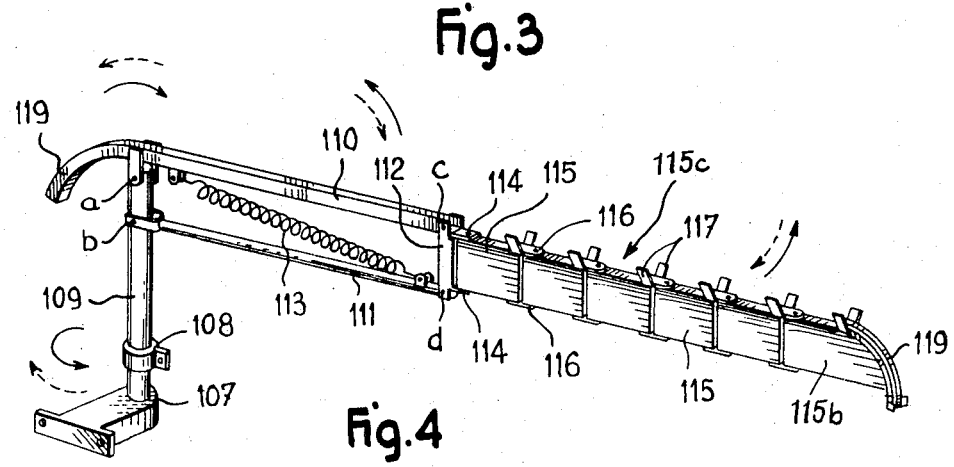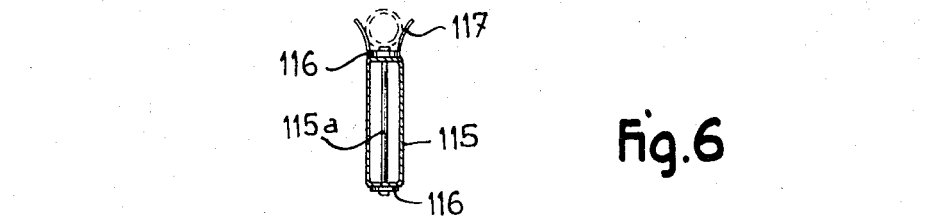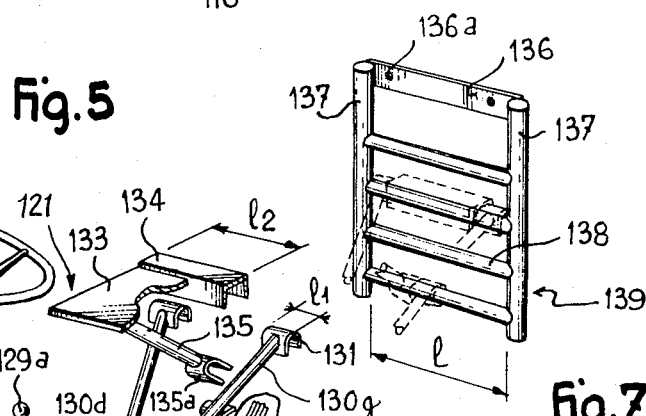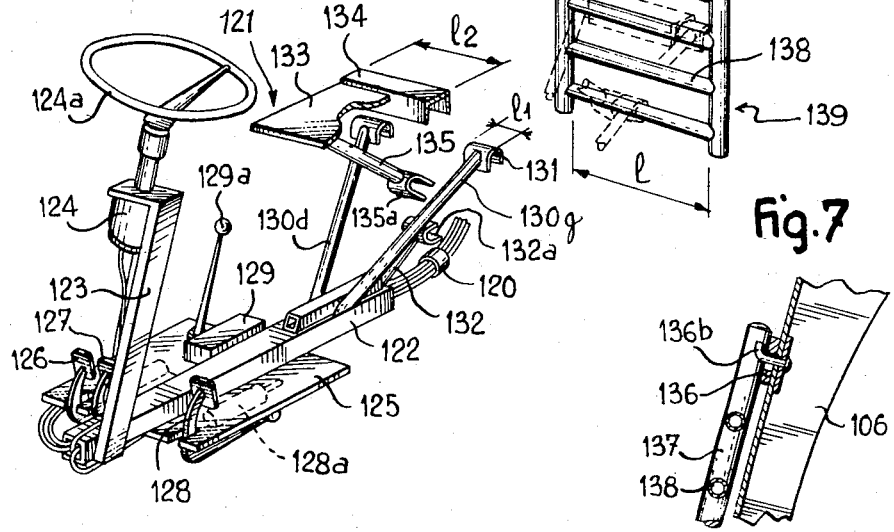

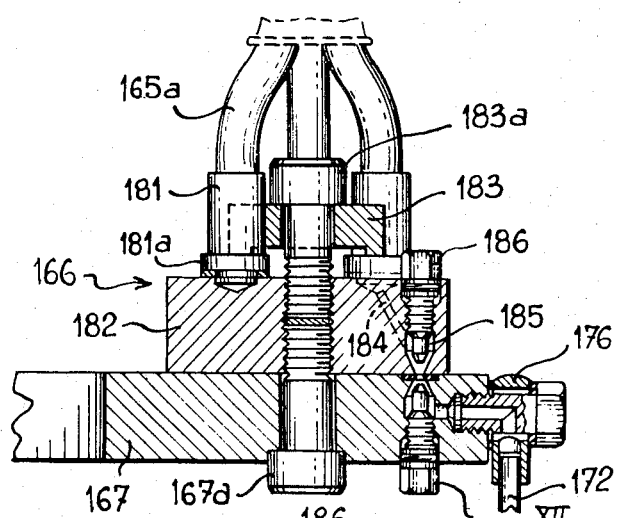
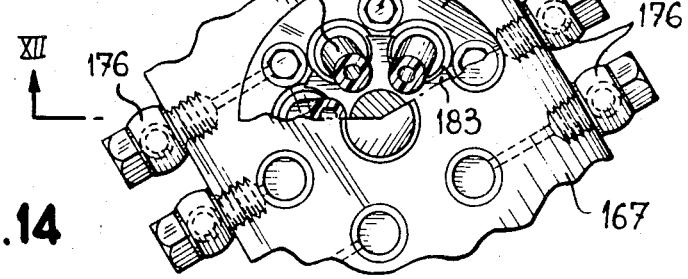
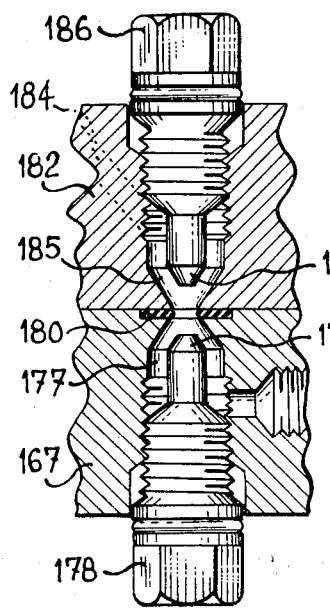
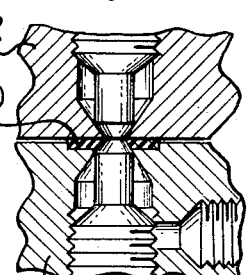
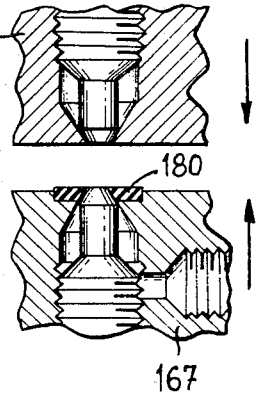
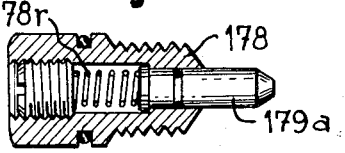

REMOVABLE POSITIONABLE VEHICLE CONTROL CENTER

This application is a continuation-in-part application of applicant's application, Ser. No. 652,472, filed July 11, 1967, for "A Self-Contained Control Unit Adapted For The Equipment Of Self-Propelled Multiple-Purpose Vehicle and since abandoned."

The present invention relates to improvements to a self-contained control unit able to be utilized, in various positions, on self-propelled multiple-purpose vehicles and on machines or motorized attachments, such as are found in agriculture and in public works.

Already proposed are self-propelled vehicles equipped with control units suitably connected by cables to the components of an engine and to the steering equipment of these vehicles or of devices which are associated thereto, in order to permit various driving positions each adapted to a particular utilization of a vehicle or of a device (see U.S. Pat. Nos. 2,831,544 and 3,036,652). But these known control units do not permit a single operator to rapidly effect their transfer from one driving position to another.

Further, such control units cannot equip an apparatus which is simply attached to the self-propelled vehicle for which they are usually provided, with a view to driving the vehicle from this device.

A first object of the invention is to propose a self-contained control unit which can ensure at least one driving position on a self-propelled vehicle and at least one other driving position on an apparatus towed by this vehicle or mounted on the latter.

Another object of the invention is to provide a self-contained control unit enabling an operator to effect transfers alone from one driving position to another.

A further object of the invention is to provide a self-contained control unit enabling an operator, without tiring himself, to effect frequent transfers in view he various driving operations of the vehicle to which the unit is connected.

A still further object of the invention is to provide supports for flexible cables devised to connect a self-contained control unit to the engine and the steering devices of a self-propelled vehicle, in order to permit rapid and practical driving position transfers.

A fifth object of the invention is to propose suspension means combined with flexible cable supports in order to bear a part of the load of the components of a self-contained control unit, with a view to facilitating the transfer of the latter.

Other objects and advantages of the invention will be made apparent from the following description taken in connection with the accompanying drawings, which description and drawings are given only by way of non-limitative example.

In the drawings:

FIG. 3 shows in perspective and on an enlarged scale a support for the flexible cable equipping the control unit of FIGS. 1 and 2.

FIG. 4 shows in cross-section on an enlarged scale one of the elements of support of FIG. 3.

FIGS. 5 and 6 show respectively, in perspective and on an enlarged scale, the frame elements of the control unit of FIGS. 1 and 2.

FIG. 7 shows in vertical section and on an enlarged scale a detail of FIG. 1.

FIG. 12 shows in elevation and with partial cutaway a head for connecting the hydraulic pipes to a connecting plate.

FIG. 13 shows in section on the line XII—XII of FIG. 12, the connecting head shown in that figure.

FIGS. 14 to 16 are views on an enlarged scale depicting the operation of the connecting head of FIGS. 12 and 13.

FIG. 17 shows, in axial section, an alternative form of embodiment of an essential element of the connecting head of FIGS. 12 and 13.

Figure 1:
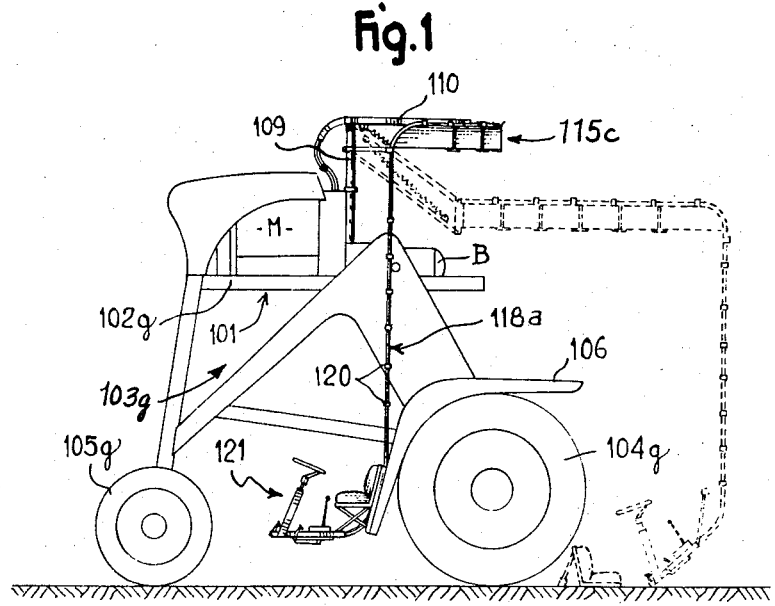
FIGS. 1 and 2 show respectively in side elevation and in plan the outline of a self-propelled vehicle equipped with a control unit according to the invention.
Figure 2:
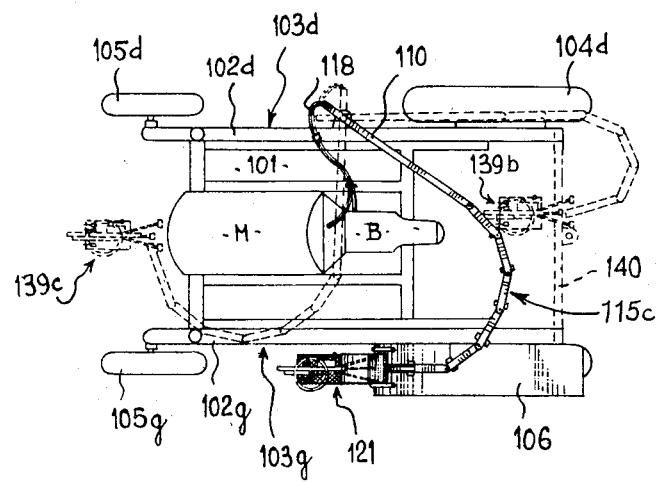

In FIGS. 1 and 2 can be seen a self-propelled vehicle comprising a chassis constituted by a platform designated by the reference numeral 101, on which is mounted an internal combustion engine M, conventionally associated to an assembly B comprising a clutch device, a gear box and a differential axle.

The sides of this platform 101 comprise two side-members 102d, 102g which are attached to the upper parts of the bars (not referenced) forming two similar flanks 103d, 103g which are respectively equipped with driving wheels 104d, 104g and with steering wheels 105d, 105g.

Conventional transmission means, not shown, are suitably arranged on the flanks 103d, 103g to ensure the driving of wheels 104d, 104g by the assembly B associated to the engine M.

Wheels 105d, 105g are mounted on the elements of conventional steering devices (not shown), suitably fixed on the flanks 103d, 103g of the chassis of the vehicle.

Finally, a conventional mudguard 106 is mounted on flank 103g over the driving wheel 104g.

Further, the lower end of a rod 107 arranged vertically is secured to the side-member 102d, this rod 107 having a circular section, best seen in FIG. 3.

A conventional stop-collar 108 is tightened on this rod 107 and a sleeve 109 is engaged on rod 107 until it abuts on collar 108 to constitute a pivot carried by the vehicle, the internal section of sleeve 109 being likewise circular and adapted to pivot on rod 107.

The ends of the two bars 110, 111 of equal length are hinged respectively, in a conventional manner, at a, b on sleeve 109, hinge a being formed on the upper part of sleeve 109. The two other ends of these bars 110, 111 are likewise hinged at c and d on the end parts of a small bar 112 the length of which is adapted to the spacing between the hinges a and b in order to form a hinged parallelogram a,b,c,d which can be deformed in a vertical plane passing through the geometrical axis of the pivot rod 107.

Finally, the ends of a traction spring 113 are suitably attached respectively to the bar 110 and the bar 111, to maintain the latter in a substantially horizontal position.

The small bar 112 comprises two lobes 114 respectively in the region of hinges c and d bent at right angles with respect to small bar 112 and extending practically into the extension of bars 110 and 111. One end of a relatively flat tubular element 115 of rectangular section, the height of which is adapted to the spacing between lobes 114 (FIG. 4), is engaged between the latter. The upper and lower horizontal faces of element 115 and lobes 114 each have a hole, these holes being arranged opposite each other, and through them is threaded a hinging stud 115a placed vertically.

At the other end of this element 115 are secured on its facing horizontal surfaces, two lobes 116 similar to lobes 114 to permit the mounting, by hinging, of another element 115 identical to the element 115 described hereinabove.

Other elements 115 are similarly hinged end to end to form an element which is maintained horizontal at various levels by the parallelogram a,b,c,d and the shape of which can be changed, due to the hinges of lobes 116.

It will be understood that the bar 110 is constituted by a sectional element in the shape of a U open at the top and tabs 117 are welded to the upper surface of each link like element 115c 115, said tabs extending upwards substantially into the extension of the sides of their links 115 to constitute a deformable trough which lengthens that of bar 110, in such a way that it is able to restrain a cable 118 resulting from the junction of the flexible cables to which reference will be made hereinafter.

Finally, the free end of sectional bar 110, similarly to that of the last link like element 115b is rigid with troughs 119 curved downward, the curve of which is adapted to that which may be supported without danger by the elements of cable 118.

It will be noted that in this example, three of the flexible cables forming control line 118 are constituted by flexible lines suitably filled with fluid to permit conventional remote hydraulic transmissions.

For two of these pipes, the ends of their portions bearing on groove 119 of bar 110 are engaged and bound on tubes rigid with a steering system comprising a hydraulic gear (not shown) which is associated to the mechanism for steering wheels 105d, 105g,.

The corresponding end of the third pipe is similarly mounted on the clutch device of assembly B of the engine of the vehicle.

Other flexible cables, generally known as BOWDEN cables, are each constituted by a twist-joint of metal wires engaged in a flexible metal sheath and their ends which are nearest to pivot 107 are respectively associated to the accelerator, to gearbox members and to braking members of the vehicle.

Finally, flexible electricity-conducting wires are connected in a usual manner by one of their ends to the control members of the engine and of the vehicle.

These pipes, cables and wires are grouped together at different places by means of collars 120 made of elastic material, in order to form the flexible cable 118 which is positioned in the trough of the bar 110 and in the trough of chain 115c.

The shaped trough 119 of the end link 115c permits the free suspension of the other end-portion 118a, of power control line 118 and the corresponding ends of the fluid lines, cables and wires which it comprises are connected, in a conventional manner, to usual steering and driving control means disposed on a part of the frame of a control unit 121, FIGS. 1 and 2 which is shown more clearly in FIGS. 5 and 6.

In FIG. 5 is shown a tubular side-member 122 one end of which is rigid with an upright 123. To this upright is secured a casing 124 equipped with a steering column having a steering wheel 124a. It will be noted that this casing constitutes one of the elements of the assisted steering system mentioned hereinabove and that the first two hydraulic pipes of cable 118, mentioned above, being threaded through the hollow core of member 122, have their ends bound to tubes provided on this casing 123.

Further, a substantially rectangular plate 125 is secured below the lower surface of side member 122; under this plate are formed three hinges having an axis perpendicular to the direction of the side member 122 for two pedals 126, 127 situated on one side of side-member 122 and for a third pedal 128 situated on the other side of said side-member.

It will be indicated that the axes of pedals 126, 127 are rigid with crank-shafts on which are attached, in a usual manner, the ends of two of the BOWDEN type cables (mentioned above) previously threaded through the hollow core of side-member 122. It will be noted that pedal 126 is thus connected to the accelerator of engine M and that pedal 128 is similarly connected to the braking device of the vehicle.

Similarly, the axis of pedal 128 is rigid with a shaft attached to the piston rod of a jack 128a, the cylinder of which is formed with a tube (not visible in the figure) on which is bound the end of the third hydraulic pipe, likewise threaded through the hollow core of side-member 122.

Finally, a casing 129 is disposed on plate 125, behind pedals 126, 127; this casing is equipped with a conventional lever 129a for the remote control of the elements of a gearbox, by the intermediary of BOWDEN cables, also threaded through the hollow core of side-member 122 and the ends of which are suitably mounted on the corresponding members of this casing 129.

Moreover, two companion tie-rods 130d, 130g are secured symmetrically on either side of the lateral surface of the side-member 122 and on the part of the latter which is opposite the part equipped with upright 123.

These two tie-rods extend obliquely upward and behind the side-member and their free ends are each equipped with a hook 131; further, a strut 132, equipped with a fork 132a, secured to the end of side-member 122, and extends likewise upward and behind this side-member.

Moreover, above tie-rods 130d, 130g may be seen a rectangular plate 133, the edge of which, being transverse in relation to side-member 122 and disposed in the right hand portion of the drawing, is rigid with a shaped element 134 having a U-shaped section open towards the bottom.

A strut 135, having at its bottom a fork 135a, is welded beneath the part of this plate which is opposite axis of this socket is placed vertically and the bottom end of a tubular bar 156 is fixed into this socket to form a vertical upright.

Two flanges 157, similar to each other and shaped like part of a circular crown are held apart from each other by three cross-pieces 158 to form an assembly the center part of which is secured to one side of the socket 155, the cross-pieces 158 being positioned horizontally and transversely in relation to the chassis of the tractor.

Furthermore, the center of curvature of the crown portions of these flanges is situated above cross-bar 154. Two grooved pulleys 159 are engaged on each of the cross-pieces 158 between the two flanges 157, said pulleys being devised to pivot freely on said cross-piece.

Moreover (FIGS. 9 and 10), a sleeve 160 having an internal cross-section adapted so that the sleeve may slide freely along upright 156 to which it is engaged. This sleeve 160 is rigid with an assembly of flanges 157a equipped with cross-pieces 158a and grooved pulleys 159a, identical to the assembly described above. This assembly is positioned above assembly 157, 158, 159 and its center of curvature faces downward.

Further, a small stirrup piece 161 equipped with a small grooved pulley 162 is welded to the top of upright 156. A flexible cord 163 is inserted into the groove of said pulley and one of its ends is secured to the top of sleeve 160. Said cord is threaded through the hollow center of said upright 156 and its other end is secured to one end of a traction spring 164, likewise housed in the hollow center of upright 156, and the other end of this spring 164 is secured to the bottom of said upright 156.

Further, a flexible cable 165 is wound in a usual way, in two turns, over pulleys 159, 159a of the support thus formed by the assemblies associated to upright 156.

It will be noted that in this example the cable 165 is constituted by hydraulic pipes for remote control of the type mentioned above, these pipes being threaded through a sheath of flexible material in order that they may be grouped in the form of a flexible cable.

The end of this sheath situated near the tractor engine is rigid with a collar 151a suitably fixed to chassis 151 of the tractor and the corresponding ends of the hydraulic pipes are connected, as has been described hereinabove, to the various driving and steering members of the tractor (steering disconnection, acceleration, gear changing and braking devices).

The other ends of the hydraulic pipes are mounted, as will be described hereinafter, on a connection head 166 which is secured to a plate 167 rigid with a vertical socket 168 formed on the frame of the control unit of the tractor.

This frame is formed by the assembly of a horizontal plate 169a on the edges of two vertical plates 169b in order to offer the general form of a reversed U adapted to the cross-section of the middle of the chassis of the tractor. The site and the stability of this frame 169a, 169b over chassis 151 are ensured by companion pegs and notches (not shown) provided on the corresponding parts of the frame and of the chassis 151, and which are able to cooperate by simple interlocking under the effect of the weight of plates 169a, 169b.

The bottom edges of plates 169b which form the flanks, are rigid with foot-rests 170 equipped with pedals, not referenced, and a steering device 171 including steering wheel and steering column is fixed to the front part of plate 169a, for a straddled driving position.

Socket 168 is secured to plate 169a and conventional tube connections 172 for the hydraulic fluid are mounted on connecting plate 167, their other ends being suitably connected, in a manner similar to that described above, to the members associated to the pedals, levers and steering means mounted on the frame.

Finally the framework of a seat 173a has a rod 173 adapted to be engaged by gravity in the vertical socket 168, in order to complete the control unit of the tractor.

The foregoing description teaches that the tractor can be driven from this control unit by the intermediary of hydraulic pipes 165 wound on to the pulley device 159, 159a, rigid with upright 156.

Figure 11:
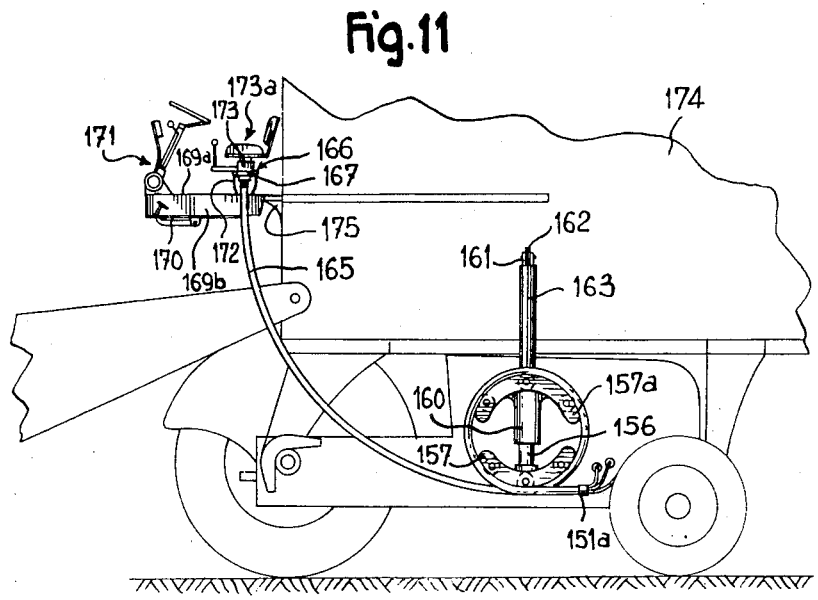
FIG. 11 is a view on a reduced scale depicting one mode of utilization of the control unit of FIG. 9.

It may readily be seen that a machine such as that described in application Ser. No. 878,414, and since issued as U.S. Pat. No. 3,641,747 resulting from the combination of this tractor and an implement 174 (FIG. 11) devised to be pulled by this tractor, may be equipped, by means of operations similar to those mentioned hereinabove, with the control unit of the tractor. In fact, it suffices to raise the seat 173a, and then to disengage the frame 169a, 169b from the tractor chassis, in order to mount this frame on a bracket 175 provided on the implement 174.

During this operation of displacing frame 169a, 169b, a traction is exerted on cable 165 so that the pulley device 158, 158a operates in similar fashion to a rope pulley-block, sleeve 160 and its pulley support sliding downward in opposition to the pull of spring 164 to enable the free end of the cable to extend in order to adapt itself to the spacing between the new position of the control unit and the tractor chassis.

Obviously, due to its support, the movement of the cable does not hinder the transfer of the control unit.

In FIGS. 12 and 13 moreover, plate 167 may be seen to be rigid with socket 168 of the frame of the control unit.

One end of each of the fixed and rigid pipes 172 which extend from the members of the control means of the control unit, is mounted on plate 167 by means of a union 176 of the type commonly known as "Banjo."

Each union 176 is screwed into a bore which communicates with a hole, one end 177 of which is shaped as a cone frustum, formed in plate 167 and equipped with a screw 178 which is able to close this communication and which includes a needle 179 having a point which corresponds to said cone frustum.

Needle 179 can be formed of strong but at the same time relatively flexible material, for example "Teflon," and can be rigidly secured in an axial hole of screw 178. It may also (FIG. 17) be constituted by a pin 179a capable of sliding in a coaxial bore of screw 178 and of being subjected in a conventional manner to the thrust of a compression spring 178r, suitably mounted in a chamber formed in said screw.

The point of needle 179 is able to cooperate with a relatively flexible joint 180, forcibly engaged in a recess coaxial and adjacent to the conical part of the hole of the trough 134 and extends obliquely downward in the direction of the latter. It will be noted that plate 133 constitutes a frame devised to support a seat-cushion and a back-rest.

In FIG. 6 is shown a flat bar 136 having two holes 136a, and on the ends of this bar are welded into tubular uprights 137; further, these two uprights are assembled parallel to each other, by means of bars 138 to form a ladder 139. It will be noted that the width $l$ of each of these bars 138 is equal to the arithmetical sum of the width $l_1$ of the two hooks 131 and of the length $l_2$ of element 134.

Finally, it will be noted that the spacing between two neighboring bars 138 of ladder 139 is practically equal to one-half of the spacing formed between hooks 131 of tie-rods 130d, 130g and fork 132a of strut 132 and is equal to one-half of the spacing formed between the reversed groove of element 134 and fork 135a of strut 135.

In FIG. 7 can be seen on a larger scale a part of the mudguard 106 of driving wheel 104g; the front surface of this mudguard is equipped with two hooks 136b, placed at the same level and forming between then a spacing substantially equal to the spacing of the holes 136a of bar 136 of ladder 139.

The foregoing description makes understood that it is possible to equip the mudguard 106 with a ladder 139, then to engage on one of the bars 138 of the top part of this ladder hooks 131 of tie-rods 130d, 130g, side-member 122 being suitably inclined, so that by swiveling, the fork 132a engages on another bar 138, situated lower down. It is thus possible to similarly engage, in the inclined position, element 134 between hooks 131 of the first bar 138 and then, by tilting, to engage the fork 135a on the other bar beside fork 132a.

The overhang of the loads of the seat and of side-member 122 with respect to ladder 139 ensure the securing of the parts of this unit on said ladder.

Mudguard 106 thus equipped with ladder 139 constitutes a support rigid with the chassis of the vehicle (FIGS. 1 and 2) on which is mounted a control unit 121, 133 from which, due to steering wheels 124a, it is possible to direct the vehicle in a conventional manner at different speeds, due to pedals 126, 127 and speed-changing lever 129a and pedal 128.

Figure 8:
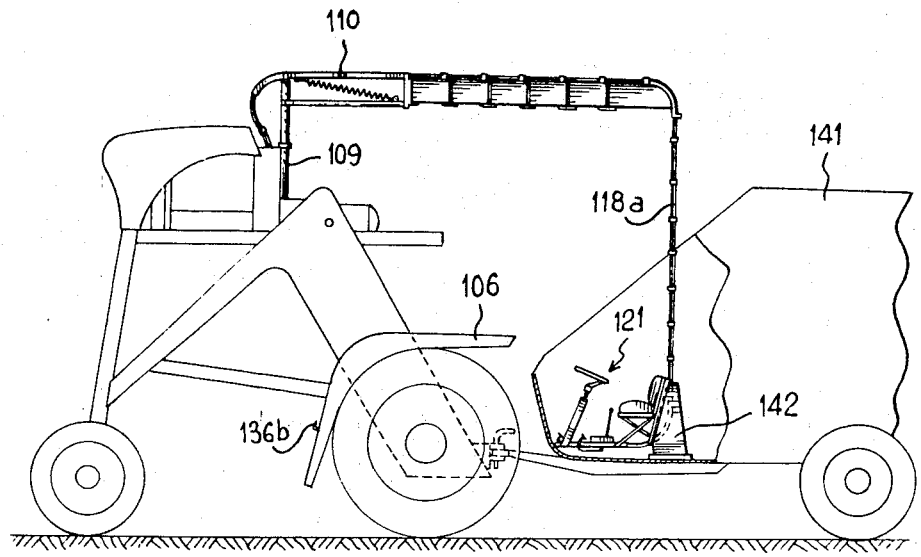
FIG. 8 is a view depicting a preferred embodiment of the control unit of FIGS. 1 and 2.

Further, it will be specified that the lower rear portion of the elements of the rear part of the chassis of the vehicle of FIGS. 1 and 2 can be equipped with a cross-member 140, represented by a dotted line in FIG. 2. This cross-member 140 is equipped with a rim permitting the attachment of a trailer 141 (FIG. 8). The front part of the floor of trailer 141 comprises two vertical plates 142 (only one is visible in this figure in partial section), similar to each other and assembled at their tops by means of a cross-member equipped with hooks (not visible in the figure) they are similar to hooks 136b of mudguard 106.

It will be seen that this control unit can be transferred from mudguard 106 of the vehicle to supports 142 of trailer 141.

The seat disposed on plate 133 and the other part 121 of the control unit can be removed one after the other from ladder 139, by reverse operations to those mentioned above and can be successively placed on the ground (shown as a dotted line in FIG. 1).

It is then possible to remove ladder 139 from mudguard 106 in order to attach it to supports 142 of trailer 141, and then to move part 121 of the control unit towards these supports in order to mount part 121 on ladder 139, as described hereinabove.

During these unhooking, removal and attachment operations, part 118a of cable 118 acts upon its supports in such a way that the bracket formed by bars 110, 111 pivots about bar 107 and changes its level, due to hinges a,b,c,d and the chain formed by links 115 changes shape so that the trough 119 of the last link 115 accompanies suspended part 118a of the flexible cable to the new utilization position of the control unit.

Further, under the effects of the traction of spring 113 on bars 110 and 11, part 118a bears a portion of the load of the assembly 121 which enables the operator to make this transfer from support 106 to support 142 without tiring himself; he can then mount the seat on this support in order to steer the vehicle from the trailer.

Such a driving mode can be advantageous, for example during the loading of fodder in a field as, when the loading is completed, the operator can transfer the control unit from supports 142 of the trailer to mudguard 106 of the vehicle, in order to transport the fodder along a road.

It will likewise be understood that ladder 139 can comprise several sets of cross-bars 138 to provide a range of assembly levels for the control unit, each adapted to a special utilization of the control unit.

Further, other elements of the chassis of the vehicle could be equipped with hooks identical to hooks 136b in order to receive a ladder 139, or cross-bars similar to cross-bars 138 of this ladder could be provided on front or rear parts of the chassis of this vehicle to allow for driving positions (such as those represented by the dotted line in FIG. 2) adapted to various utilizations of the vehicle, these positions being situated within the area encompassed by the free end of the deformable supports 110, 115 of cable 118a.

Finally, the vehicle of FIG. 1 can be equipped with means for the assembly of different implements to form various machines; these implements could be provided with assembly hooks 136b to permit a driving position adapted to the use of such a machine.

Moreover, the form of embodiment of the supports for the flexible cables which, in the example described above, conveniently ensure to part of these cables an elevated position above the chassis of the tractor, can equip likewise other vehicles provided for utilizations which impose various control positions.

Figure 9:
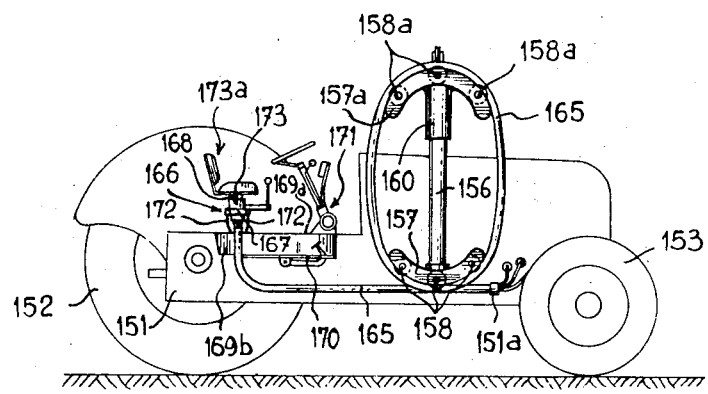
FIG. 9 shows in side elevation a conventional tractor equipped with an alternative form of embodiment of the control unit of FIGS. 1 and 2.
Figure 10:
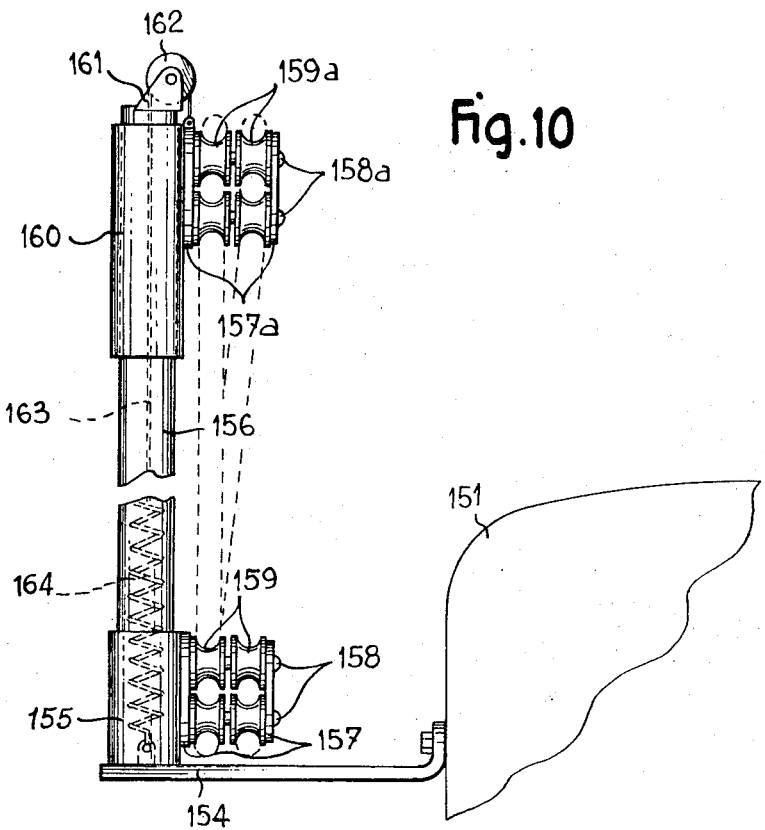
FIG. 10 shows in transverse elevation and on an enlarged scale a support for the flexible cable equipping the tractor of FIG. 9.

On the other hand, the form of embodiment of the supports shown in FIG. 9 can advantageously equip a conventional agricultural tractor to permit such utilizations.

FIG. 9 shows a usual agricultural tractor comprising a chassis 151, conventionally equipped with driving wheels 152 and steering wheels 153. On the middle part of one side of the chassis 151 is secured horizontally and transversely, for example by bolts, a bar 154 (best shown in fig. 10).

This bar 154, thus arranged to overhang, extends approximately as far as the median vertical plane of wheels 152 and 153 between which it is situated and a socket 155 is welded to the free end of bar 154. The screw 178. The interior lateral wall of this joint 180 forms part of the seating of the conical face of the point of needle 179.

It will be understood that other screws identical to screw 178 are mounted, as described hereinabove, on plate 167, and are regularly spaced on a coaxial crown with a hole formed in plate 167 for a bolt 167a. Each screw 178 corresponds with one of the rigid pipes 172 mounted on plate 167 by means of unions 176 mentioned above.

Likewise in FIGS. 12 and 13 can be seen the flexible pipes 165a of cable 165. The end of each pipe 165a is set leak-tightly in bushes 181 having securing collars 181a devised to be held fast on a circular plate 182 with the aid of the branches of a star-shaped element 183 and of a bolt 183a engaged in a hole in the center of element 183, and in a hole tapped axially in plate 182. The free end of bush 181 of each pipe 165a is in fact formed in the shape of a conical seating able to cooperate leaktightly with a companion seating formed in plate 182. These seatings are regularly arranged on a circumference about the axis of bolt 183a.

Further, conduits 184 (shown by a dotted line) are formed slantwise in plate 182 starting from these pipe seatings 165a, to establish communications with holes 185 having tapering ends which are identical to holes 177 described hereinabove.

These holes 185 are formed parallel to the axis of the hole of bolt 183a and are arranged on a crown similar to that of holes 177 of plate 167. Further, they are equipped with screws 186, having needles 187, similar to screws 178. Needles 187 offer the speciality of lightly touching, in the closed position, the face of plate 182 devised to bear against the corresponding face of plate 167. It will be understood that the bore of bolt 183a of the plate 182 is devised to receive the threaded end of bolt 167a, thereby ensuring the securing of plate 182 to plate 167.

Finally, a guiding pin, not shown, is provided on one of plates 167 or 182, to enable each needle 187 to face the companion needle 179 so as to connect each member of the tractor to its control means mounted on frame 169a of the control unit.

The foregoing description makes understood that it is possible to separate, without loss of fluid and without the entry of air into pipes 165a and 172, plate 167 from the head 166 formed by mounting the ends of pipes 165a on plate 182.

In fact (FIGS. 14 to 16), it is enough to screw home the screws 186, then to screw the screws 178, to bring into contact the free parts of needles 187 and 179. It is then possible to loosen bolt 167a and then to screw home screws 178 to tighten needles 179 on their joints 180. Disengagement of bolt 167a then frees the head of plate 167.

It is then possible to place between plate 167 rigid with the frame of the control unit and the head 166 of the flexible cable 165, another flexible cable (not shown) comprising the same number of hydraulic pipes as the cable 165. The ends of this other cable are respectively equipped with a head identical to head 166 and with a head similar to said head 166 but equipped with joints 180. Thus the zone of utilization of the control unit may be increased.

It is only necessary to check that the respective faces of the heads of the extension cable are perfectly clean, and then by the reverse operations to those described above and with the help of a system of conventional fish-plates equipped with tightening bolts, the head equipped with joints 180 is associated to head 166 of cable 165. The other head of the extension cable identical to head 166 can then be mounted on plate 167 of the frame of the control unit to permit a control position relatively remote from chassis 131 of the tractor. Thus the control unit may be mounted on the rear of a multi-bladed plough towed by this tractor, in order to facilitate the supervision and control of the relatively long apparatus so formed.

What is claimed is:

1. A self-contained control unit for use with a self-propelled vehicle having driving and steering mechanism and adapted to have mounted thereon or towed thereby an apparatus having a plurality of supports on the vehicle comprising a frame adapted to be removably attached relative to the vehicle at any one of a plurality of attaching points: driving and steering guidance control means mounted on said frame: flexible power means, the ends of which are respectively connected to the driving and steering guidance control means on said frame and the driving and steering mechanism of the vehicle: and deformable means adapted to be secured to and supported on said vehicle forming a support for said flexible power means for adapting to the variable positioning of said frame to each driving position to permit driving and steering control from any selected position point of the frame relative to the driving and steering mechanism of the vehicle, said deformable means further including an upright having means for adjusting the height of the upright and parallelogram means mounted on said upright, and a deformable assembly of cable supports connected to said parallelogram means.

2. A self-contained control unit according to claim 1 characterized in that said parallelogram means includes a device of bars horizontally hinged to said upright permitting the adaptation of the level of cable supports to each position of the control unit.

3. A self-contained control unit according to claim 1 characterized in that said frame of the unit comprises at least two parts, at least one part of which is equipped with securing means which operates by interlocking under the action of gravity on one of said plurality of supports provided on said vehicle, the other part of which being equipped with further securing means also operating by interlocking under the action of gravity on one of said plurality of supports on said vehicle.

4. A self-contained control unit according to claim 3 characterized in that each of said securing means comprises an assembly of elements permitting said interlocking; said assembly including two tie-rods each equipped with hooks, a strut equipped with a fork, and said plurality of supports including a ladder-type element formed of spaced bars and uprights for mounting thereon said hooks and said fork; said ladder-type element being mounted on said vehicle or apparatus.

5. A self-contained control unit according to claim 1 characterized in that the deformable means includes a pivot element adapted to pivot and to slide on said upright and engaged on the latter, and that said parallelogram means are mounted on said pivot element.

6. A self-contained control unit according to claim 5 characterized in that said parallelogram means includes two bars horizontally hinged, at one end, to the pivot element and at the other end, to said deformable assembly of cable supports; and spring means attached to said bars to maintain said bars in a predetermined position.

7. A self-contained control unit according to claim 6 characterized in that the deformable assembly of cable supports includes elements hinged vertically, end to end, in the form of a chain deformable in the horizontal plane.

8. A self-contained control unit according to claim 6 characterized in that the deformable assembly of cable supports includes, at its free end, a convex surface for bearing the cables, the curvature of said surface being adapted to the suspension of a vertical part of said cables.

9. A self-contained control unit according to claim 1 characterized in that the frame of the control unit includes a channel bar supporting at one end thereof said driving and steering guidance control means, the end of said flexible power means being longitudinally fixed to said channel bar.

10. A device for use with a self-propelled vehicle having driving and steering mechanism, a frame equipped with detachable securing means adapted to be removably attached on the vehicle or on an apparatus mounted thereon or towed thereby, driving and steering guidance control means mounted on said frame and flexible power means, the ends of said flexible power means being respectively connected to the driving and steering guidance control means on said frame and to the driving and steering mechanism of the vehicle; comprising a vertically extending member mounted on the frame of said vehicle, pivotable means mounted on said member adapted to be pivoted about a vertical axis extending through said member, deformable supports adapted to be secured to said pivotable means for supporting said flexible power means; said supports including elements extending in a substantially horizontal plane and being integrally mounted, at one end thereof, to said pivotable means, said elements being vertically adjustable relative to said member.

11. A device as defined in claim 10 further comprising stop means mounted on said vertically extending member and abuting said pivotable means.

12. A device as defined in claim 11 characterized in that the opposite end of said supports includes a chain of rigid elements hinged vertically, end to end.

13. A device as defined in claim 12 characterized in that said chain includes, at its free end, a convex surface for bearing the cables, the curvature of said surface being adapted to the suspension of a vertical part of said cables.

14. A device as defined in claim 10 characterized in that said elements include a system of parallel bars and said integral mounting thereof comprises horizontally hinged means whereby said system is disposed in the form of a parallelogram deformable in a vertical plane, said bars being connected to resilient means for the return of said supports into a predetermined position.

15. A device as defined in claim 14 characterized in that the opposite end of said supports includes a chain of rigid elements hinged vertically, end to end.

* * * * *